United States Patent Office 3,480,874
Patented Nov. 25, 1969

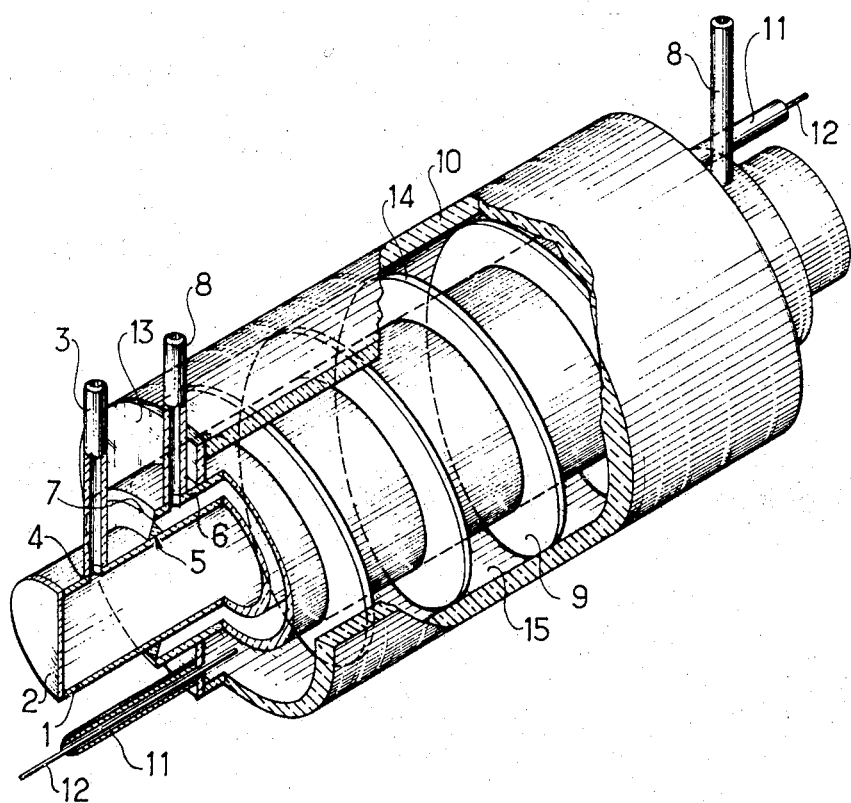

3,480,874
LIQUID LASER CONSTRUCTION
Alexandre Milochevitch and Serge Rousseau, Saint-Michel-sur-Orge, France, assignors to Compagnie Generale d'Electricite, Paris, France, a corporation of France
Filed Dec. 19, 1968, Ser. No. 785,212
Claims priority, application France, Dec. 26, 1967, 133,770
Int. Cl. H01s 3/02
U.S. Cl. 330—4.3                4 Claims

ABSTRACT OF THE DISCLOSURE

The invention relates to a liquid laser structure characterized by the fact that it comprises three coaxial tubes welded to one another. The first of which tubes constitutes the reservoir of the laser liquid and the space between the first and second tubes constitutes a duct for a cooling fluid and for absorbing parasitic rays. The space between the second and third tubes defines the volume necessary for obtaining a spark tube.

---

The present invention concerns liquid lasers comprising a means for creating a flash upon excitation of the liquid contained in the laser.

Liquid lasers excited by a flash tube are known in the art. These lasers are formed of a number of basic elements, such as, the laser tube containing the liquid, a protective envelope serving to cool it and to permit the absorption of the ultra-violet radiation, and finally a flash tube which may be of rectilinear or helical form. The flash tube may be made in the form of two coaxial tubes, the space between these two tubes comprising a wall in the form of a helix which defines a helical channel filled with gas and forming the flash tube.

These three elements are disposed coaxially one within the other and are situated in a resonating cavity of the Perot-Fabry type. The combination of these three elements results in a cumbersome assembly which is difficult to handle and which is impractical for industrial use.

The present invention has for its object the elimination of the disadvantages presented by the known devices and to make it possible to produce singly or in large quantities, lasers of small overall dimensions suitable for industrial use.

The present invention relates to a liquid laser excited by the flash of a flash tube, distinguished notably by the fact that the laser tube is constructed in one piece formed by the assembly of at least three tubes consisting of Pyrex or of quartz, which are welded together.

The laser according to the invention has many advantages over prior art devices, for example, the manufacture of the laser takes place in combined operations in the glass working stage; the laser is of reduced overall dimensions; and the manufacture involves a minimum of operations because the laser is formed of elements which are currently commercially obtainable in standardized dimensions. Also, the construction of the laser according to the invention has increased rigidity and is capable of being assembled rapidly. Further, the light emanating from the flash tube is absorbed to a smaller extent by reason of the reduction of the number of walls through which it must pass. Additional features and advantages of the present invention will become apparent in the course of the following description with reference to the accompanying drawing, in which the single figure diagrammatically illustrates in perspective the laser constructed in accordance with the invention.

The laser tube according to the invention is formed of three coaxial tubes consisting of quartz or other similar material. The tube 1, which constitutes the laser tube proper, is closed at each end perpendicularly to the axis of the tube 1 by a plate 2 transparent to the laser radiation under consideration. A sleeve 3 fitted on and welded at 4 constitutes a duct for the admission of the liquid serving to fill the laser tube 1. This liquid is generally $SeOCl_{12}$ (selenium oxychloride). A single sleeve 3 is necessary for filling the laser tube 1 with a liquid which is static. However, if the liquid is to flow continuously through the tube, it could be discharged, for example, through another sleeve such as 3 disposed at the other end of the tube 1.

Two rings 5 are disposed on the outside surface of the tube 1 at each of its ends and are not far from the laser fluid admission duct 3 such that the distance between these two rings is less than the length of the tube 1. The whole assembly is covered by a tube 6, the ends of which are welded at 7 to the rings 5. The tube 6 carries at each end a sleeve 8 serving as an outlet and an inlet duct for a cooling liquid such as potassium dichromate $K_2CrO_4$ which absorbs the ultra-violet radiation (the cooling action of this fluid being secondary).

A wall 9 in the form of a helix is separately formed and welded to the outside surface of the tube 6. A tube 10 forming an outer sleeve is thereafter fitted over the wall 9 and the inside surface of the tube 10 is welded to the edge 14 of the helical wall 9. Each end of the tube 10 on the helical wall 9 is welded to the corresponding end of the tube 6 by means of a wall 13. The space thus defined by the elements 6, 9 and 10 forms a helical channel 15 at each of its ends with orifices 11 serving for pumping and injecting gas and also the electrodes 12 which are of the conventional type.

The material used in the construction of this laser is generally quartz. The form of revolution of its construction makes it possible to weld almost all of its elements by the application of a laser beam, so that the optical elements can be continuously welded without deformation to the cylindrical tube and thereby form a fluid cavity. The surfaces to be welded are optically polished and brought into optical contact with each other. The radiation of the laser is continuously focused by an optical system on the line of separation of the two parts to be welded. The line of separation travels at constant linear speed past this focal point.

The helical form illustrated in the figure is the most advantageous, however, a coaxial rectilinear flash tube may also be produced by welding two rings to each of the ends of the tube 6 and directly welding the tube 10 to these two rings. The two electrodes can then be symmetrically positioned above the center of this construction.

The dimensions of a laser thus constructed, and its superior performance, are shown by way of the following example. For an innertube having a length of 150 mm., a diameter of 20 mm., and filled with selenium oxichloride with a pump energy of 1500 joules, the laser supplies at a pulse of 80 microseconds in the relaxed condition an energy of 10 joules, with a radiation at 1.056 microns. The overall diameter of the assembly of the laser would in this case be of the order of 70 millimeters. In the case of selenium oxichloride, the tube will generally consist of quartz.

Of course, the invention is in no way limited to the embodiment described and illustrated, which has been referred to only by way of example. More particularly, modifications in detail may be made and certain features may be changed or certain means replaced by equivalent means without departing from the scope of the invention.

What is claimed is:
1. A liquid laser optically pumped by the flash of a discharge tube comprising: a unitary structure formed of three coaxial tubes welded together wherein the first of said tubes constitutes a reservoir for the laser liquid, the space between said first and said second tubes constitutes a passage for cooling fluid, and the space between said second and said third tubes comprises a wall in the form of a helix defining a helical channel filled with gas to form a flash tube.

2. The liquid laser according to claim 1 wherein the rims of said helical wall are welded respectively to the outer surface of said second tube and to the inner surface of said third tube.

3. The liquid laser according to claim 1 wherein at least one of said tubes consists of quartz.

4. The liquid laser according to claim 1 wherein said helical wall consists of quartz.

References Cited

UNITED STATES PATENTS 3,210,687   10/1965   Boyd et al. _____ 331—94.5

RODNEY D. BENNETT, Jr., Primary Examiner

C. E. WANDS, Assistant Examiner

U.S. Cl. X.R.

331—94.5